US009416842B2

(12) United States Patent
Martinez et al.

(10) Patent No.: US 9,416,842 B2
(45) Date of Patent: Aug. 16, 2016

(54) ISOLATORS HAVING DAMPER-EXTERNAL THERMAL COMPENSATORS AND SPACECRAFT ISOLATION SYSTEMS EMPLOYING THE SAME

(71) Applicant: HONEYWELL INTERNATIONAL INC., Morristown, NJ (US)

(72) Inventors: Daniel Martinez, Guaynabo, PR (US); Jose Pagan, Isabela, PR (US); Cesar Arroyo, San Sebastian, PR (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 486 days.

(21) Appl. No.: 13/851,653

(22) Filed: Mar. 27, 2013

(65) Prior Publication Data
US 2014/0291452 A1    Oct. 2, 2014

(51) Int. Cl.
*F16F 9/52* (2006.01)
*B64G 1/66* (2006.01)

(52) U.S. Cl.
CPC .. *F16F 9/526* (2013.01); *B64G 1/66* (2013.01)

(58) Field of Classification Search
CPC ............ F16F 9/526; F16F 9/53; F16F 9/532; F16F 9/535; F16F 9/537; F16F 9/50; F16F 9/20; F16F 9/3235; F16F 9/483; F16F 15/02; F16F 15/022; F16F 13/00; F16F 13/28; F16K 15/00; F16K 15/022; B64G 1/66; B64G 1/22; B64G 1/641; B64G 1/283; B64G 1/285; B64G 1/286; B64G 2001/228; B60N 2/505; B60N 2/502; B60N 2/525; B60N 2/501; B60N 2/522; B60N 2/544; B64C 27/51
USPC ......... 188/274, 380, 379, 378, 322.19, 266.7, 188/282.3, 298; 244/173.2
See application file for complete search history.

(56) References Cited

U.S. PATENT DOCUMENTS

| 4,760,996 A * | 8/1988 | Davis ........................ F16F 9/52 188/276 |
| 5,305,981 A * | 4/1994 | Cunningham ......... B64G 1/283 244/173.2 |

(Continued)

FOREIGN PATENT DOCUMENTS

| EP | 0539930 A1 | 5/1993 |
| EP | 2524872 A1 | 5/2011 |

OTHER PUBLICATIONS

EP Search Report for Application No. 14160751.5 dated Sep. 25, 2014.

(Continued)

*Primary Examiner* — Robert A Siconolfi
*Assistant Examiner* — San Aung
(74) *Attorney, Agent, or Firm* — Ingrassia, Fisher & Lorenz, P.C.

(57) ABSTRACT

Embodiments of an isolator are provided, as are embodiments of a spacecraft isolation system employing a number of three parameter isolators. In one embodiment, the isolator includes an externally-pressurized damper assembly and a thermal compensator, which is located external to the externally-pressurized damper assembly. The damper assembly includes, in turn, a damper assembly housing and a first hydraulic chamber configured to be filled with a damping fluid. The first hydraulic chamber is located within the damper assembly housing and is fluidly coupled to the thermal compensator. A first bellows is disposed within the damper assembly housing and bounds an inner circumference of the first hydraulic chamber such that the first bellows is externally pressurized when the first hydraulic chamber is filled with the damping fluid.

19 Claims, 5 Drawing Sheets

(56) References Cited

U.S. PATENT DOCUMENTS

| | | | |
|---|---|---|---|
| 5,332,070 A | 7/1994 | Davis et al. | |
| 5,439,082 A | 8/1995 | McKeown et al. | |
| 5,794,909 A | 8/1998 | Platus et al. | |
| 5,947,457 A | 9/1999 | Swanson et al. | |
| 6,003,849 A | 12/1999 | Davis et al. | |
| 6,092,795 A | 7/2000 | McGuire | |
| 6,131,709 A | 10/2000 | Jolly et al. | |
| 6,217,011 B1 | 4/2001 | Redinger | |
| 6,390,254 B1 * | 5/2002 | Bennett | F16F 9/20 188/280 |
| 6,431,530 B1 | 8/2002 | Stamps et al. | |
| 6,715,591 B2 * | 4/2004 | Davis | B64G 1/641 188/266.2 |
| 7,766,136 B2 | 8/2010 | Runkel | |
| 8,002,094 B2 | 8/2011 | Ruebsamen et al. | |
| 8,132,773 B1 | 3/2012 | Platus | |
| 8,177,202 B2 | 5/2012 | De Forges et al. | |
| 8,240,641 B2 | 8/2012 | McGuire | |
| 8,261,896 B2 | 9/2012 | Boyd et al. | |
| 2008/0142633 A1 | 6/2008 | McGuire et al. | |
| 2010/0207008 A1 * | 8/2010 | Cottrell | B64D 27/26 248/638 |
| 2010/0320358 A1 | 12/2010 | Boyd et al. | |
| 2012/0267506 A1 * | 10/2012 | Hadden | F16F 15/06 248/636 |

OTHER PUBLICATIONS

EP Exam Report for Application No. 14160751.5 dated Oct. 13, 2014.

* cited by examiner

ISOLATORS HAVING DAMPER-EXTERNAL THERMAL COMPENSATORS AND SPACECRAFT ISOLATION SYSTEMS EMPLOYING THE SAME

TECHNICAL FIELD

The present invention relates generally to spacecraft isolation systems and, more particularly, to embodiments of an isolators having a thermal compensator located external to the damper assembly to which the thermal compensator is fluidly coupled.

BACKGROUND

Control moment gyroscope arrays, reaction wheel arrays, and other such devices deployed onboard spacecraft for attitude adjustment purposes generate vibratory forces during operation. Vibration isolation systems are commonly employed to minimize the transmission of vibratory forces emitted from such attitude adjustment devices, through the spacecraft body, to any vibration-sensitive components (e.g., optical payloads) carried by the spacecraft. Vibration isolation systems commonly include a number of individual vibration isolators (typically three to eight isolators), which are positioned between the spacecraft payload and the spacecraft body in a multi-point mounting arrangement. The performance of a vibration isolation systems is largely determined by the number of isolators included within the system, the manner in which the isolators are arranged, and the vibration attenuation characteristics of each individual isolator. Vibration isolation system employing three parameter isolators, which behave mechanically as a primary spring in parallel with a series-coupled secondary spring and damper, provide superior attenuation of high frequency vibratory forces (commonly referred to as "jitter") as compared to vibration isolation systems employing other types of passive isolators, such as viscoelastic isolators. The three parameter isolators are advantageously implemented as single degree of freedom ("DOF") devices, which provide damping along a single longitudinal axis. An example of a single DOF, three parameter isolator is the D-STRUT® isolator developed and commercially marketed by Honeywell, Inc., currently headquartered in Morristown, N.J.

Three parameter isolators are often equipped with a thermal compensation device, which regulates the pressure of the damping fluid within the damper assembly as damping fluid volume fluctuates due to changes in temperature. By common design, the thermal compensator is nested within the damper assembly housing. As the result of such a nested design, the dimensions and the operational capabilities of the thermal compensator are inherently limited by the size of the damper assembly. In instances wherein the three parameter isolator need only operate in low impact, short stroke range environments of the type encountered on-orbit, such design constraints may be acceptable as the operative temperature range and variations in damping fluid volume also tend to be relatively limited. However, in instances wherein the three parameter isolator need also operate under high impact, long stroke range conditions, it may be desirable for the thermal compensator to regulate fluid pressure within the damper assembly at relatively high operating temperatures. While certain dimensions (e.g., the outer diameter) of the damper assembly can be increased to allow a corresponding increase in the size of the thermal compensator components, this results in significant penalties in the overall size and weight of the three parameter isolator. Such an increase in thermal compensator size also results in undesirable increase in the overall size of the thermal compensator chamber and, therefore, an increase in the overall volume and weight of the damping fluid.

It is thus desirable to provide embodiments of an isolator, such as a three parameter isolator, having a thermal compensator suitable for regulating damping fluid pressure within a damper assembly under long stroke/high impact load operating conditions. Ideally, embodiments of such an isolator would allow the overall size and weight of the damper assembly to be minimized, while also allowing greater freedom in selection the thermal compensator components to, for example, enable the thermal compensator to be imparted with relatively high starting pressure and/or to allow a reduction in the overall volume and weight of the damping fluid. More generally, it would be desirable to provide embodiments of spacecraft isolation systems employing a number of such isolators. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of an isolator, such as a three parameter isolator, are provided. In one embodiment, the isolator includes an externally-pressurized damper assembly and a thermal compensator, which is located external to the externally-pressurized damper assembly. The damper assembly includes, in turn, a damper assembly housing and a first hydraulic chamber configured to be filled with a damping fluid. The first hydraulic chamber is located within the damper assembly housing and is fluidly coupled to the thermal compensator. A first bellows is disposed within the damper assembly housing and bounds an inner circumference of the first hydraulic chamber such that the first bellows is externally pressurized when the first hydraulic chamber is filled with the damping fluid.

Embodiments of an isolation system for minimizing the transmission of vibrations between a spacecraft and a spacecraft payload are further provided. In one embodiment, the isolation system includes a plurality of three parameter isolators and mounting hardware coupled to the plurality of three parameter isolators and configured to mount the plurality of three parameter isolators to the spacecraft. Each of the three parameter isolators includes an externally-pressurized damper assembly and a thermal compensator, which is located external to the externally-pressurized damper assembly. The damper assembly includes, in turn, a damper assembly housing and a first hydraulic chamber configured to be filled with a damping fluid. The first hydraulic chamber is located within the damper assembly housing and is fluidly coupled to the thermal compensator. A first bellows is disposed within the damper assembly housing and bounds the inner circumference of the first hydraulic chamber such that the first bellows is externally pressurized when the first hydraulic chamber is filled with the damping fluid.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes exemplary embodiments of an isolator, such as a three parameter isolator, including an improved, damper-external thermal compensator; that is, a thermal compensator located external to the damper assembly to which the thermal compensator is fluidly coupled. Due to the external disposition of the thermal compensator, the dimensions of the thermal compensator can be increased without a corresponding increase in the overall size and weight of the damper assembly. Such a structural configuration allows the thermal compensator components to be optimally sized to provide multiple benefits, which may include reductions in one or more of the following: the inner and outer diameters of the bellows within the damper assembly, the inner and outer diameters of the damper assembly housing, the length of the damper assembly piston, the overall damping fluid volume, the length of the thermal compensator preload spring contained within the thermal compensator (if included), the overall weight of the isolator, and/or analysis and verification iteration cycle time. Furthermore, in preferred embodiments, the isolator includes externally-pressurized damper assembly (that is, a damper assembly containing one or more externally-pressurized bellows) to decrease the likelihood of isolator buckling under high impact load conditions.

Embodiments of the below-described isolator may be especially useful instances wherein the isolator is deployed onboard a satellite or other spacecraft having mission requirements demanding isolator operation during spacecraft launch, as well as during deployment in space (referred to herein as "on-orbit"). In such cases, the isolator is effectively required to operate in two different modes: (i) an on-orbit mode during which low impact, high frequency vibrations are transmitted through the isolator, and (ii) a launch mode during which significant impact high loads are transmitted through the isolator at lower frequencies. During launch mode, the damper assembly may be required to dissipative significant amounts of kinetic energy, which results in a pronounced increase in damping fluid temperature and volume. This increase in damping fluid volume can result in an undesired increase in pressure within the damper assembly and potential leakage if not adequately accommodated by the thermal compensator. The damper-external thermal compensator described herein support such a dual functionality by maintaining damping fluid pressure within acceptable limits in the presence of such high operating temperature that may occur during high impact load/large stroke operating conditions, such as those encountered during spacecraft launch, while also accommodating more minor fluctuations in damping fluid temperature and volume that may occur during low stroke operating conditions, such as those encountered during post-launch, on-orbit operation of the isolator.

Few, if any, conventionally-designed isolators are capable of reliable operation in on-orbit and launch modes of the type described above and traditionally have not been required to provide such dual mode operation due, at least in part, to the usage of launch lock devices. Specifically, it has been common practice to equip spacecraft isolation systems with a number of launch locks, which are positioned between the spacecraft and the payload support structure (a palette or bench) in parallel with the isolators. During spacecraft launch, the launch locks maintain the payload support structure in a fixed spatial relationship with the spacecraft. In so doing, the launch locks shunt significant inertial or shock loads generated during spacecraft launch around the isolators to protect the isolators from damage that might otherwise occur. At a desired juncture after launch, the launch lock assemblies are actuated to allow relative movement between the payload support structure and the spacecraft. For example, in an implementation wherein the spacecraft isolation system includes a number of single DOF, three parameter isolators of the type described above, the isolators may be maintained in compressed state by the launch lock assemblies prior to launch. The isolators are preloaded in their compressed positions and biased toward design or free length positions. When the launch locks are released, the isolators expand axially into the design position and displace the payload support structure outward from the spacecraft body. The payload support structure, supported by or "floating on" the isolators, is now able to move relative to the spacecraft; and the isolators function collectively to dampen vibrations transmitted between the payload support structure and the spacecraft body.

While protecting the isolators from impact loads during spacecraft launch, the usage of launch locks is associated with a number of disadvantages. The usage of multiple launch locks adds additional part count, weight, and hardware cost to the spacecraft isolation system. Initial set-up and fine tuning of launch lock systems can be fairly labor-intensive resulting in higher labor costs and production times. The reliability of launch locks systems may be less than optimal. As a still further drawback, many launch locks are actuated utilizing pyrotechnic devices that tend to produce undesirably high shock forces when detonated, which can potentially disrupt the payload or spacecraft components. Finally, as launch locks shunt vibrations forces around the isolators during spacecraft launch, the usage of launch lock systems results in limited isolation of the payload from high impact loads generated during spacecraft launch. These disadvantages can be overcome through usage of dual range isolators of the type described above, which eliminate the need for launch locks. Thus, spacecraft isolation systems can be produced including a plurality of the below-described dual range isolators and lacking launch locks, although the possibility that a spacecraft isolation system may include the below-described dual range isolators in combination with one or more launch locks is by no means precluded.

An example of a single DOF (axially-damping), three parameter isolator including a damper-external thermal compensator and capable of operating under high impact conditions, such as those encountered during spacecraft launch, and operating under low impact, high frequency conditions, such as those encountered during on-orbit operation, is described below in conjunction with FIGS. 4-6. First, however, an overarching description of a spacecraft isolation system in provided below in conjunction with FIG. 1, and a general description of three parameter isolators that may be included in the spacecraft isolation system is provided below in conjunction with FIGS. 2 and 3. While described herein primarily in the context of a single DOF, three parameter isolator deployed within a multi-point spacecraft isolation system, it is emphasized that embodiments of the isolator including the damper-external thermal compensator can be implemented as other types of isolators, such as three parameter isolators providing isolation in multiple DOFs and two parameter isolators. Furthermore, embodiments of the below-described isolator can be employed in multi-point isolation systems other than spacecraft isolation systems, such as terrestrial, waterborne, and airborne isolation systems.

Figure 1:
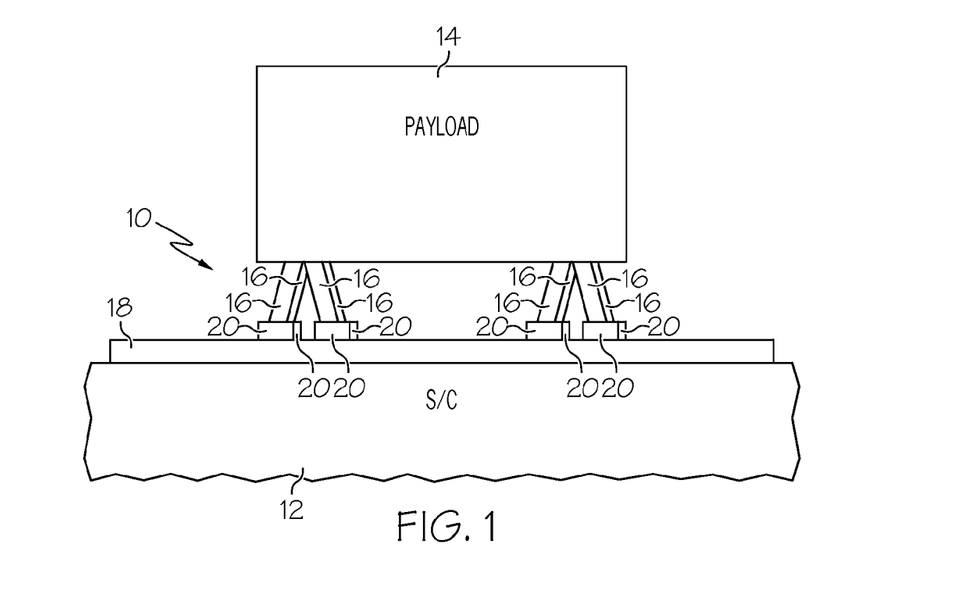
FIG. 1 is simplified schematic of a spacecraft isolation system employing eight isolators suitable for attenuating the transmission of vibrations between a spacecraft and a payload in six degrees of freedom in accordance with an exemplary embodiment of the present invention.

FIG. 1 is simplified schematic of a spacecraft isolation system 10 illustrated in accordance with an exemplary embodiment of the present invention and well-suited for reducing the transmission of vibrations from a spacecraft 12, such as a satellite, to a payload 14 carried by spacecraft 12. Isolation system 10 includes a plurality of isolation devices or isolators 16, which are mechanically coupled to and collectively support payload 14. In preferred embodiments, isolators 16 serve to reduce vibration and impact forces transmitted between spacecraft 12 and payload 14 both during on-orbit operation of spacecraft 12 and during launch of spacecraft 12. For this reason, isolators 16 may be referred to as "dual mode isolators 16" hereafter. The opposing ends of dual mode isolators 16 are mounted to a spacecraft mounting interface 18 utilizing a plurality of mounting brackets 20. Dual mode isolators 16 are advantageously implemented as single degree-of-freedom dampers, which each provide damping in an axial direction. Isolators 16 are positioned in a multi-point mounting arrangement. In this particular example, isolation system 10 includes eight isolators 16, which are positioned in an octopod mounting arrangement to provide high fidelity damping in six degrees of freedom ("6-DOF"). In further embodiments, isolation system 10 may include a lesser number or a greater number of isolation devices, which may be positioned in other mounting arrangements. For example, in an alternative embodiment, isolation system 10 may include six isolators 16 positioned in a hexapod or Stewart platform-type mounting arrangement.

In certain embodiments, payload 14 may assume the form of a vibration-sensitive component, such as an optical payload or sensor suite; and isolation system 10 may serve to minimize the transmission of vibrations from a vibration-emitting source aboard spacecraft 12, through spacecraft mounting interface 18, and to payload 14. Similarly, as noted above, isolation system 10 may serve to minimize the transmission of impact forces through spacecraft mounting interface 18 and to payload 14 during spacecraft launch. In other embodiments, payload 14 may include one or more vibration-emitting devices, and isolation system 10 may serve to reduce the transmission of vibrations from payload 14 to spacecraft 12 and any vibration-sensitive components deployed thereon. In this latter regard, payload 14 may include one or more rotational devices utilized in the attitude adjustment of spacecraft 12, such as one or more reaction wheels or control moment gyroscopes.

Figure 2:
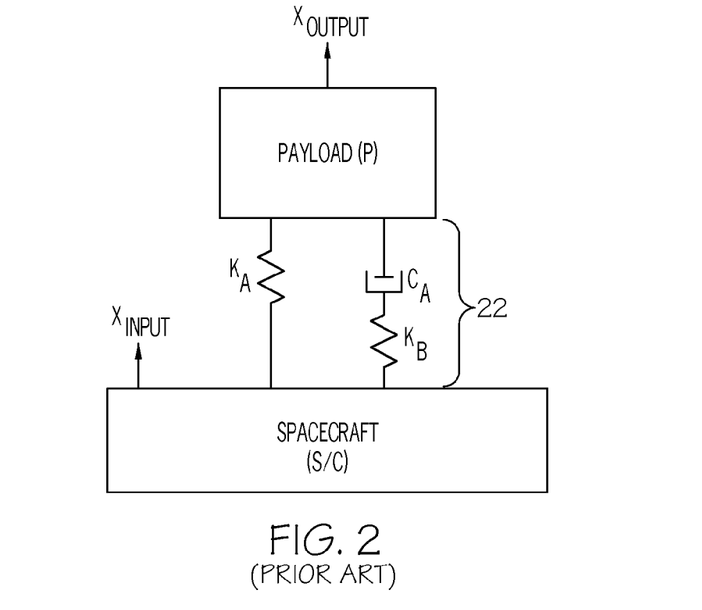
FIG. 2 is a schematic of an exemplary three parameter vibration isolator illustrated in accordance with the teachings of prior art.

FIG. 2 is a schematic representation of an exemplary three parameter isolator 22 mechanically coupled between a payload "P" and a spacecraft "S/C" and illustrated in accordance with the teachings of prior art. As modeled in FIG. 2, three parameter isolator 22 includes the following mechanical elements or components: (i) a first spring component $K_A$, which is mechanically coupled between payload P and a host spacecraft S/C; (ii) a second spring component $K_B$, which is mechanically coupled between payload P and spacecraft S/C in parallel with first spring component $K_A$; and (iii) a damper $C_A$, which is mechanically coupled between payload P and spacecraft S/C in parallel with the first spring component $K_A$ and in series with the second spring component $K_B$. Transmissibility of three parameter isolator 22 is expressed by the following equation:

$$T(\omega) = \frac{X_{output}(\omega)}{X_{input}(\omega)} \qquad \text{EQ. 1}$$

wherein $T(\omega)$ is transmissibility, $X_{output}(\omega)$ is the output motion of payload P, and $X_{input}(\omega)$ is the input motion imparted to isolator 22 by spacecraft S/C.

Figure 3:
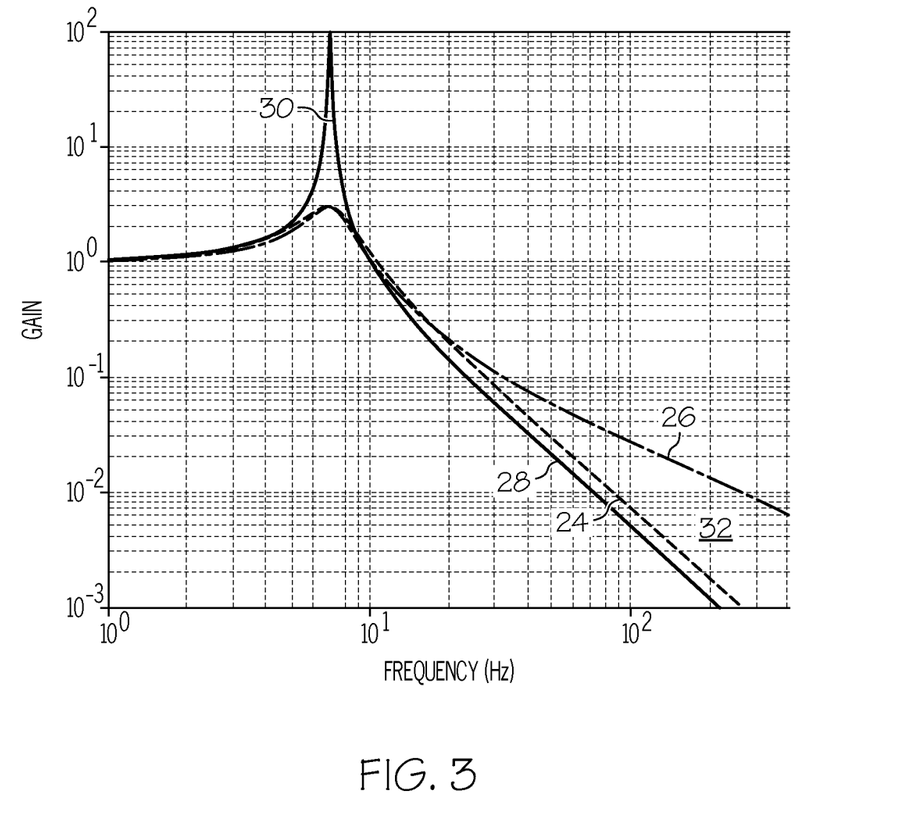
FIG. 3 is a transmissibility plot of frequency (horizontal axis) versus gain (vertical axis) illustrating the transmissibility profile of the three parameter isolator shown in FIG. 2 as compared to the transmissibility profiles of a two parameter isolator and an undamped device.

FIG. 3 is a transmissibility plot illustrating the damping characteristics of three parameter isolator 22 (curve 24) as compared to a two parameter isolator (curve 26) and an undamped device (curve 28). As indicated in FIG. 3 at 30, the undamped device (curve 28) provides an undesirably high peak gain at a threshold frequency, which, in the illustrated example, is moderately less than 10 hertz. By comparison, the two parameter device (curve 26) provides a significantly lower peak gain at the peak frequency, but an undesirably gradual decrease in gain with increasing frequency after the threshold frequency has been surpassed (referred to as "roll-off"). In the illustrated example, the roll-off of the two parameter device (curve 26) is approximately 20 decibel per decade ("dB/decade"). Lastly, the three parameter device (curve 24) provides a low peak gain substantially equivalent to that achieved by the two parameter device (curve 26), as indicated in FIG. 3 by horizontal line 34, and further provides a relatively steep roll-off of about 40 dB/decade. The three parameter device (curve 24) thus provides a significantly lower transmissibility at higher frequencies, as quantified in FIG. 3 by the area 32 bound by curves 24 and 26. By way of non-limiting example, further discussion of three parameter isolators can be found in U.S. Pat. No. 5,332,070, entitled "THREE PARAMETER VISCOUS DAMPER AND ISOLATOR," issued Jan. 26, 1984; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application.

Figure 4:
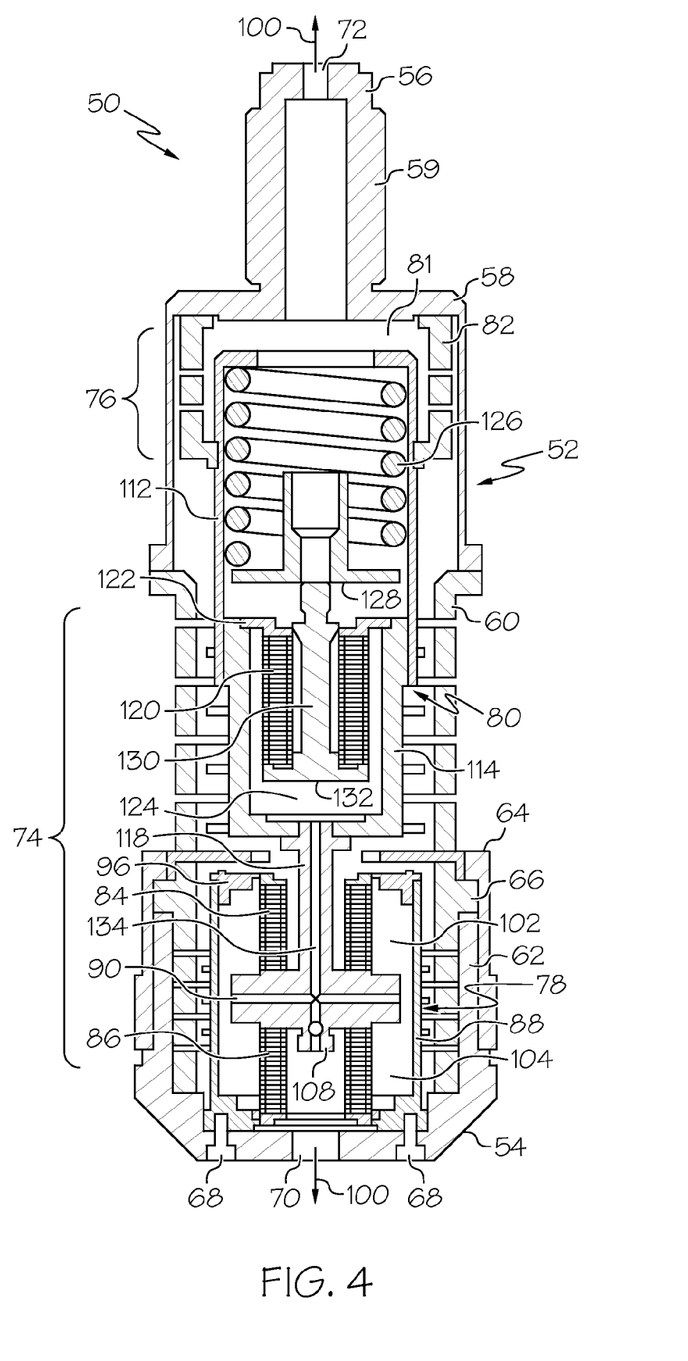
FIG. 4 is a cross-sectional view of an exemplary three parameter isolator suitable for usage as one or all of the isolation devices shown in FIG. 1 and including an externally-pressurized damper assembly and a thermal compensator, which is fluidly coupled to the damper assembly and which is capable of maintaining damping fluid pressure within a desired range under high temperature and high fluid volume operating conditions.

FIG. 4 is a cross-sectional view of an exemplary embodiment of a dual range, three parameter isolator 50 suitable for usage as one or all of dual range isolators 16 shown in FIG. 1. Exemplary dual range isolator 50 includes an isolator housing 52, which assumes the form of an axially elongated, tubular structure having a first end portion 54 (referred to herein as "base end portion 54") and an opposing end portion 56 (referred to herein as "upper terminal end 56"). Terms such as "upper," "lower," "base," and the like are utilized herein to provide a convenient frame of reference with respect to the illustrated orientation of isolator 16, as shown in FIGS. 4-6. It will be appreciated, however, that the illustrated orientation is largely arbitrary and that isolator 50 may assume any orientation in three dimensional space. When isolator 50 is deployed within a spacecraft isolating system, base end portion 54 can be mounted directly or indirectly to the host spacecraft (e.g., utilizing a mounting bracket 20, as shown in FIG. 1), while upper terminal end 56 of isolator 50 is attached directly or indirectly to the spacecraft payload (e.g., upper terminal end 56 may be bolted to or otherwise attached to a bench or palette supporting the spacecraft payload). Alternatively, the orientation of isolator 16 may be inverted such that upper terminal end 56 is mounted directly or indirectly to the host spacecraft, while base end portion 54 is secured to the spacecraft payload.

Isolator housing 52 can be assembled from any number of discrete components or pieces. In the illustrated example, isolator housing 52 includes upper and lower end caps 58 and 62, which are affixed to opposing ends of an axially-elongated, tubular housing piece 60. The uppermost portion of upper end cap 58 may include an axial extension 59 having a number of cutouts (not shown) to allow extension 59 to serve as a flexure accommodating minor misalignments in mounting. As indicated in FIG. 4, the lower end of upper end cap 58 may be imparted with a flange, which is welded or otherwise joined to a mating flange provided around the upper end of tubular housing piece 60. Lower end cap 62 may be secured over the lower terminal end of tubular housing piece 60 by an annular collar 64, which is threaded onto lower end cap 62. A flange 66 may project radially outward from housing piece 60 into an annular gap or groove provided between end cap 62 and housing piece 60 to provide a hard stop feature allowing different regions of main spring 74 (described below) to become active over different stroke ranges of isolator 50. Fastener openings 68 may be provided in lower end cap 62 to facilitate attachment of isolator housing 52 to an internally-mounted damper assembly 78 utilizing a plurality of bolts or other such fasteners, as described more fully below in conjunction with FIGS. 5 and 6. A central opening 70 is further provided through lower end cap 62 to allow physical access to a fill port 108 included within the below-described damper assembly 78. Finally, one or more fastener openings 72 may be provided through upper end cap 58 and/or lower end cap 62 to facilitate mounting of isolator 50 between the spacecraft and the spacecraft payload utilizing one or more additional fasteners (not shown).

With continued reference to FIG. 4, three parameter isolator 50 includes four active components or devices: (i) a primary or main spring 74, (ii) a secondary spring 76, (iii) a damper assembly 78, and (iv) a damper-external thermal compensator 80. Main spring 74 may be integrally formed in the annular body of tubular housing piece 60 by machining. For example, main spring 74 may assume the form of a section of tubular housing piece 60 from which material has been removed utilizing laser cutting or a similar process to form a compressible spring-like structure. In other embodiments, main spring 74 may be a discrete or independent element (e.g., a coil spring) mechanically coupled to isolator housing 52. Secondary spring 76 is also preferably implemented as a machined spring, which is formed in the outer annular wall of an annular connector piece 82 contained within isolator housing 52 and, specifically, within a cavity provided in a lower, cup-like extension of upper end cap 58. The upper circumference edge of connector piece 82 abuts the interior of cup-like extension 83 of upper end cap 58 and may be affixed thereto utilizing, for example, a plurality of fasteners (not shown). The opposing, lower end portion of connector piece 82 is joined to the outer circumferential surface of thermal compensator 80. An axial gap 81 is provided between thermal compensator 80 and the adjacent interior surface of upper end cap 58 to accommodate relatively translational movement of thermal compensator 80 with respect to isolator housing 52 as secondary spring 76 compresses and expands during isolator operation along the longitudinal or working axis 100 of isolator 50.

As previously indicated, eexemplary vibration isolator 50 is a three parameter device, which provides the desirable vibration attenuation characteristics described above, namely, a relatively low peak transmissibility and superior attenuation of high frequency vibrations. In keeping with the terminology introduced above in conjunction with FIGS. 2 and 3, $K_A$ is the axial stiffness of dual range isolator 50, as a whole, which is predominately determined by the axial stiffness of primary spring 74; $K_B$ is the volumetric stiffness of isolator 50, which is predominately determined by the axial stiffness of secondary spring 76; and $C_A$ is determined by the damping characteristics of damper assembly 78. In the exemplary embodiment shown in FIG. 4, primary spring 74 ($K_A$) is coupled in parallel with secondary spring 76 ($K_B$) and damper assembly 78 ($C_A$), which are coupled in series, as taken along a load transfer path extending through isolator 50. The instant example notwithstanding, vibration isolator 50 need not be a three parameter isolator in all embodiments and, in certain embodiments, may instead assume the form of a single degree of freedom, axially-damping, two parameter isolator including a primary spring (e.g., spring 74) in parallel with the damper (e.g., damper assembly 78), but lacking a secondary spring (e.g., spring 76) in parallel with the primary spring and in series with the damper.

Figure 5:
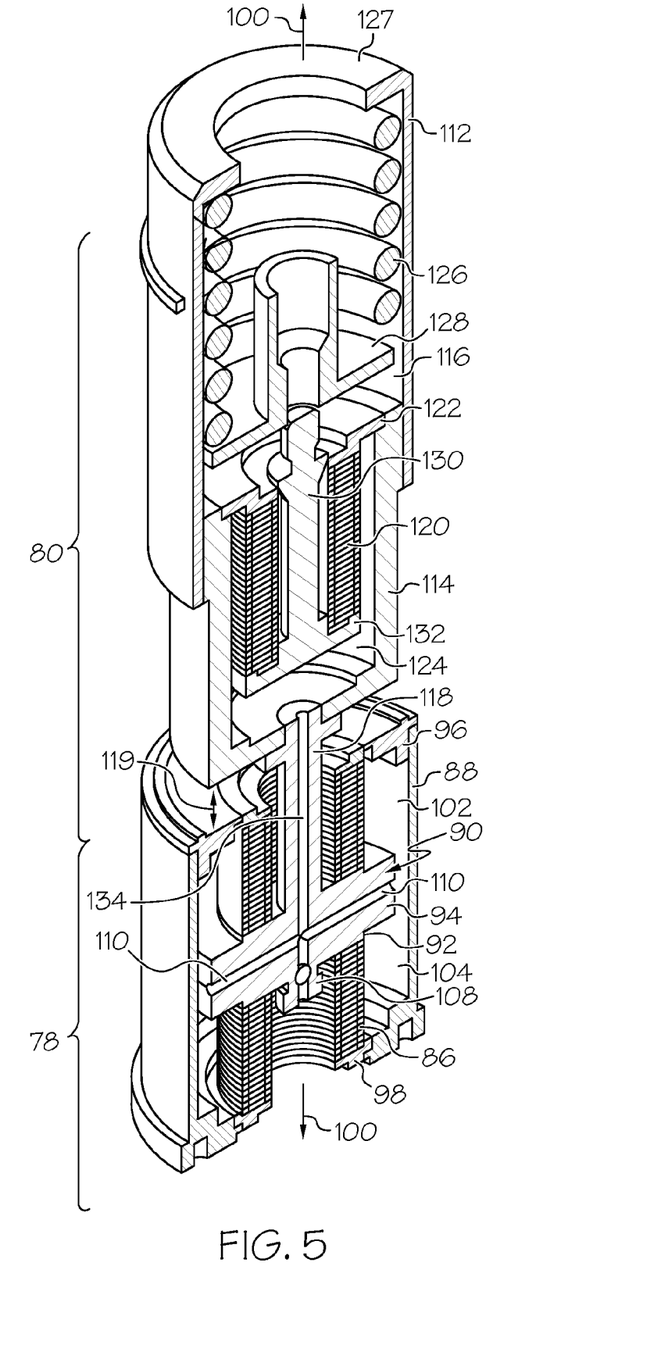
FIGS. 5 and 6 are isometric and exploded cross-sectional views, respectively, of the three parameter isolator shown in FIG. 4 illustrating the exemplary externally-pressurized damper assembly and remotely-located thermal compensator in greater detail.
Figure 6:
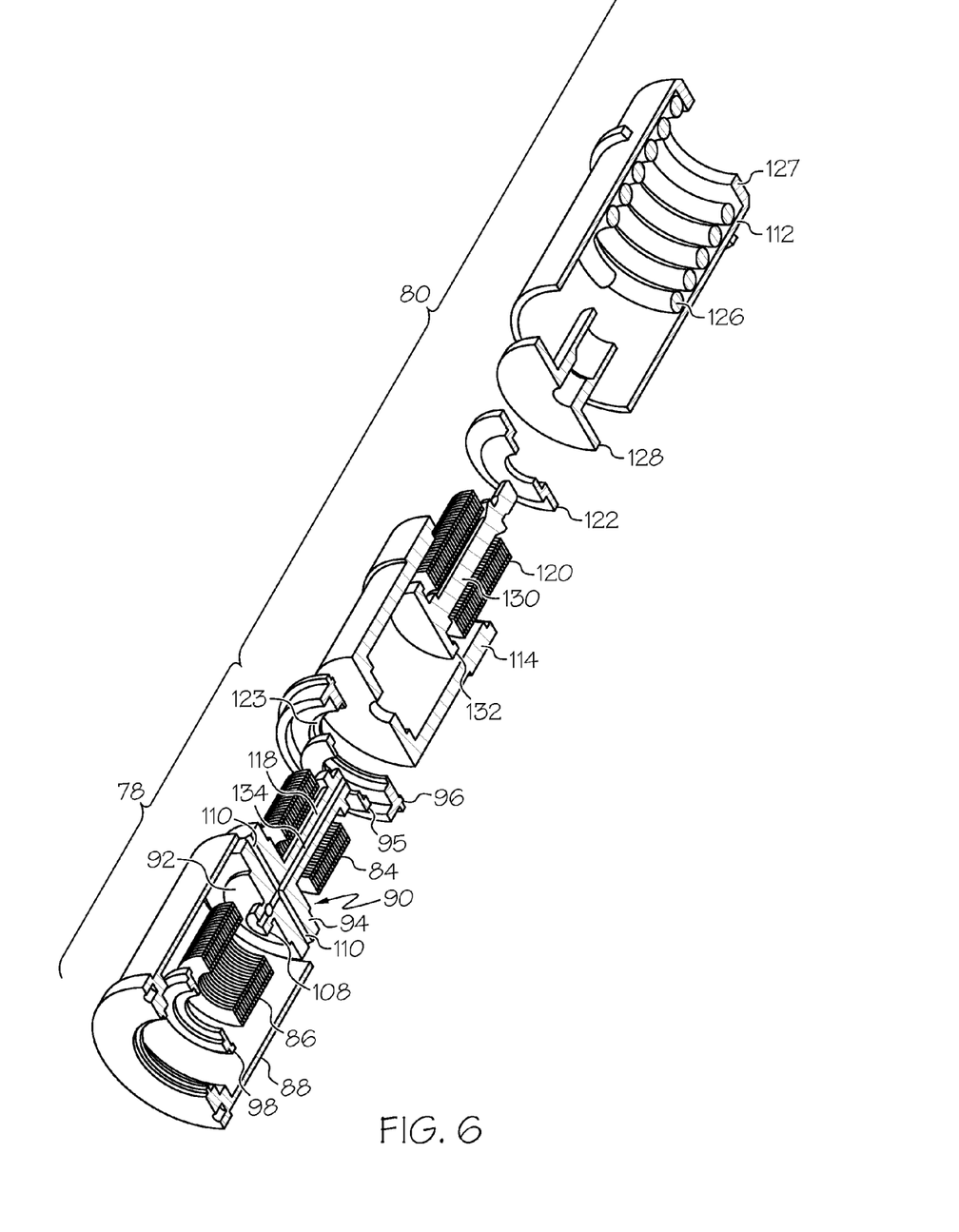

FIGS. 5 and 6 are isometric and exploded cross-sectional views, respectively, of an exemplary damper assembly 78 and thermal compensator 80, which may be included within isolator 50. Damper assembly 78 includes a damper assembly housing 88 having a generally cylindrical inner cavity, which contains a first bellows 84, a second bellows 86, and a damper assembly piston 90. Damper assembly piston 90 assumes the form of a disc-shaped body having a central portion 92 circumscribed or surrounded by an outer rim portion 94. Bellows 84 and 86 are sealingly joined to opposing faces of damper assembly piston 90 to resiliently suspend damper assembly piston 90 within damper assembly housing 88. More specifically, the lower circumferential edge of upper bellows 84 may be sealingly joined to the upper face of damper assembly piston 90, while the upper circumferential edge of lower bellows 86 may be sealingly joined to the opposing, lower face of damper assembly piston 90. To fully enclose upper bellows 84 within damper assembly housing 88, the upper circumferential edge of upper bellows 84 may be sealingly joined to an upper bellows cup 95, which is, in turn, sealingly affixed to a housing end cap 96 disposed over the upper end of damper assembly housing 88; e.g., as identified in FIG. 6, bellows cup 95 may pilot to an inner annular shelf 123 on the underside of cap 96. Finally, the lower circumferential edge of lower bellows 86 may be sealingly joined to a lower bellows cup 98, which seats on and is sealingly joined to a lower endwall of damper assembly housing 88. The above-listed components can be joined utilizing any coupling technique suitable for forming fluid-tight or hermetic seals. A circumferential bonding or welding technique is preferably employed, however, in embodiments wherein bellows 84 and 86 and the other components of damper assembly 78 are fabricated from high temperature metals or alloys.

In the illustrated example, bellows 84 and 86 are externally pressurized; that is, damping fluid acts on the external surfaces of bellows 84 and 86 during operation of dual range isolator 50. When isolator 50 is fully assembled, bellows 84 and 86 cooperate with outer rim portion 94 of damper assembly piston 90, upper end cap 96, and the interior surfaces of damper assembly housing 88 to define two hermetically-sealed hydraulic chambers 102 and 104 within damper assembly housing 88. Hydraulic chambers 102 and 104 are fluidly coupled by an intermediate annulus 106, which is bound along its inner circumference by annular rim portion 94 of damper assembly piston 90 and bound along its outer circumference by the annular sidewall of damper assembly housing 88. Prior to operation of isolator 50, opposing hydraulic chambers 102 and 104 are filled with a damping fluid (not shown), such as a silicone-based liquid. A fill port 108 may be provided through damper assembly housing 88 to enable hydraulic chambers 102 and 104 to be filled with a selected damping fluid after assembly of isolator 50. As indicated in FIGS. 5 and 6, fill port 108 is conveniently formed in central portion 92 of piston 90 and may be fluidly coupled to annulus 106, hydraulic chamber 102, and hydraulic chamber 104 by one or more radially-extending flow passages 110 (e.g., cross-bores) formed in piston 90. After filling of hydraulic chambers 102 and 104, fill port 108 may be permanently sealed by, for example, deformation of a sealing element (e.g., a copper ball) positioned within the fill port flow passage. Through the inclusion of such externally-pressurized bellows within damper assembly 78, the likelihood of isolator buckling under high impact load conditions is reduced.

Annular rim portion 94 of damper assembly piston 90 projects radially beyond opposing bellows 84 and 86 into an area between hydraulic chambers 102 and 104. The exposed annular area of damper assembly piston 90 thus acts on the fluid within hydraulic chambers 102 and 104 as piston 90 translates with respect to damper assembly housing 88 along the longitudinal or working axis 100 of isolator 50. As damper assembly piston 90 translates with respect to damper assembly housing 88, damping fluid is forced through annulus 106 and between opposing hydraulic chambers 102 and 104 to dissipate kinetic energy, largely by viscous losses, and thereby provide the provide the desired damping effect. As previously explained, dissipation of large amounts of kinetic energy may be required under high impact load, high stroke range conditions of the type encountered during spacecraft launch. As a result, significant heating of the damping fluid and a corresponding spike in damping fluid volume may occur when isolator 50 is active during spacecraft launch. Thermal compensator 80 accommodates such an expansion of damping fluid under high temperature operating conditions to maintain the pressure within hydraulic chambers 102 and 104 within an acceptable range and thereby minimize the likelihood of damping fluid leakage. A more detailed description of exemplary thermal compensator 80 will now be provided.

With continued reference to the exemplary embodiment shown in FIGS. 5 and 6, damper-external thermal compensator 80 includes a Thermal Compensator ("TC") housing 112, 114, which is located external to and axially adjacent damper assembly housing 88. In the exemplary embodiment shown in FIGS. 5 and 6, TC housing 112, 114 is assembled from two mating pieces 112 and 114, which combine or cooperate to enclose a dual diameter cavity 116. Lower TC housing piece 114 is fixedly joined to central portion 92 of damper assembly piston 90 via an axially-elongated piston shaft 118. More specifically, piston shaft 118 extends axially from central portion 92 of damper assembly piston 90, through the central channel provided through upper bellows 84, and connects with the lower end portion of thermal compensator 80. Damper assembly piston 90, piston shaft 118, and lower TC housing piece 114 are conveniently formed as a single machined piece; although this is by no means necessary. Thermal compensator 80 is thus fixedly coupled to damper assembly piston 90 by piston shaft 118 and translates therewith along working axis 100 during operation of three parameter isolator 50. An axial gap 119 (identified in FIG. 5) is provided between the lower end of thermal compensator housing 112, 114 and the upper end of damper assembly housing 88 to accommodate translational movement of thermal compensator 80 in this manner.

As shown most clearly in FIG. 5, at least one TC bellows 120 is hermetically disposed within the small diameter section of dual diameter cavity 116 provided in TC housing 112, 114. The upper circumferential edge of TC bellows 120 is welded, bonded, or otherwise sealingly joined to an upper bellows cup 122. Upper bellows cup 122 is, in turn, sealingly affixed over the open end portion of TC housing piece 114; e.g., bellows cup 122 may seat on an annular ledge provided around the interior of lower housing piece 114, as shown in FIG. 5. A generally cylindrical or disk-shaped TC piston 132 is sealingly joined to the lower terminal edge of TC bellows 120 by, for example, bonding or welding. TC piston 132 is resiliently suspended within TC housing 112, 114 by bellows 120 and can translate within TC housing 112, 114 along working axis 100. Collectively, upper bellows cup 122, TC housing piece 114, TC bellows 120, and TC piston 132 define a variable-volume TC chamber 124 within TC housing 112, 114. TC chamber 124 is bound along its outer circumference by the annular sidewall of TC housing piece 114 and along its inner circumference by the outer circumferential surface of TC bellows 120. TC bellows 120 is thus externally pressurized when TC chamber 124 is filled with a damping fluid. In further embodiments, thermal compensator 80 may include an internally-pressurized thermal compensator bellows.

If desired, thermal compensator 80 may be further equipped with a preload system. For example, as shown in FIGS. 5 and 6, thermal compensator 80 may be equipped with a preload system including a TC preload spring 126 disposed within the large diameter section of the dual diameter cavity 116 provided within TC housing 112, 114. TC preload spring 126 is compressed between an inner annular rim 127 provided around TC housing 112, 114 and TC piston 128. A piston shaft or connector rod 130 extends between TC piston 128 and TC piston 132, which may be integrally formed with connector rod 130 as a single piece. TC piston 128 and connector rod 130 transmit the spring preload force to TC piston 132 to urge movement of TC piston 132 toward damper assembly 78 (downward in the illustrated orientation) in opposition to the pressurized fluid acting on the exposed surfaces of TC bellows 120. In the illustrated example wherein TC bellows 120 is externally pressurized, connector rod 130 extends through the central channel or opening provided in TC bellows 120 and may be substantially co-axial with the working axis 100 of damper assembly 78 and isolator 50. Although the dimensions and spring rate of preload spring 126 will vary amongst different embodiments, in one embodiment, preload spring 126 is selected to have an outer diameter equal to or greater than the inner diameter of TC bellows 120. Multiple preload springs may be included in thermal compensator 80 in other implementations.

To allow fluid communication between TC chamber 124 and hydraulic chambers 102 and 104 within damper assembly 78, at least one flow passage is formed in damper assembly piston 90, through piston shaft 118, and in lower TC housing piece 114. For example, and as indicated in FIGS. 5 and 6, a longitudinal channel 134 (e.g., an axial bore) may extend through damper assembly piston 90, through piston shaft 118, and through the lower endwall of housing piece 114 defining the floor of TC chamber 124. Channel 134 connects with radial flow passages 110 formed in piston 90 to fluidly couple TC chamber 124 to opposing hydraulic chambers 102 and 104 through annulus 106. Channel 134 also extends axially beyond radial flow passages 110 to fill port 108 to allow filling of TC chamber 124 along with hydraulic chambers 102 and 104 with the chosen damping fluid at some juncture after fabrication of isolator 50 and prior to operation thereof.

By fluidly coupling TC chamber 124 to hydraulic chambers 102, 104 in the above-described manner, damping fluid can flow from hydraulic chambers 102 and 104 into TC chamber 124 to compensate for the expansion in fluid volume under high temperature operating conditions. Such operating conditions may occur when isolator 50 is active during spacecraft launch and, therefore, subject to high impact loads, relatively broad strokes of damper assembly piston 90, and relatively large displacements of the damping fluid between hydraulic chambers 102 and 104. As the temperature of the damping fluid increases, the pressure exerted on the exposed area of TC piston 132 and the exterior surfaces of TC bellows 120 will increase, as well. When force exerted on the effective area of TC piston 132 and bellows 120 by the damping fluid exceeds the bias exerted on piston 132 by TC preload spring 126, TC piston 132 will move away from damper assembly 78 along axis 100 and TC bellows 120 will compress. The volume of TC chamber 124 will increase accordingly to minimize the increase in damping fluid pressure within hydraulic chambers 102 and 104 of damper assembly 78 and thereby maintain the damping fluid pressure within a desired range. Conversely, when the damping fluid decreases in volume and the pressure exerted on TC bellows 120 drops, TC bellows 120 will expand to reduce the volume within TC chamber 124 forcing damping fluid flow through flow passage 134 and into hydraulic chambers 102 and 104 and preventing the fluid pressure within damper assembly 78 from becoming undesirably low.

The foregoing has thus provided embodiments if an isolator, such as a three parameter isolator, having a thermal compensator capable of regulating damping fluid pressure within a damper assembly over relatively broad operative temperature ranges, while allowing the overall size and weight of the damper assembly to be minimized. In the above-described exemplary embodiment, the isolator included opposing externally-pressurized bellows within the damper assembly to decrease the likelihood of isolator buckling under high impact load conditions. Furthermore, in the above-described exemplary embodiment, the thermal compensator is located external to the damper assembly and fluidly coupled thereto by one or more axially-extending flow passages, which may be formed through, for example, an axially-elongated rod or piston shaft connecting the damper assembly piston to the thermal compensator housing. Such a design enables significant reductions in the size and weight of the damper components, such as the damper assembly housing and the bellows contained therein. Such a configuration also allows the diameter of the thermal compensator bellows spring (if included) to be maximized, while the length thereof may be reduced. The overall volume of the damping fluid can thus be minimized to ease design constraints by reducing the required thermal compensator design stroke and allowing the usage of a more efficient preload spring design. The reduced damping fluid volume may also allow the ratio of damping fluid pressure change-to-volume change to be minimized, which, in turn, reduces compensator stress and reduces compensator fatigue capability. As a still further benefit, the above-described isolator can reduce analysis and verification iteration cycle as a result of the reduction in spring and damping fluid volume constraints.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An isolator, comprising:
an externally-pressurized damper assembly, comprising:
a damper assembly housing;
a first hydraulic chamber within the damper assembly housing and configured to be filled with a damping fluid; and
a first bellows disposed within the damper assembly housing and bounding an inner circumference of the first hydraulic chamber such that the first bellows is externally pressurized when the first hydraulic chamber is filled with the damping fluid; and
a thermal compensator external to the externally-pressurized damper assembly and fluidly coupled to the first hydraulic chamber.

2. The isolator of claim 1 wherein the thermal compensator comprises a thermal compensator chamber fluidly coupled to the first hydraulic chamber and configured to exchange damping fluid therewith during operation of the isolator.

3. The isolator of claim 2 wherein the damper assembly further comprises a damper assembly piston fixedly coupled to the thermal compensator and configured to translate therewith relative to the damper assembly housing.

4. The isolator of claim 3 further comprising a flow passage formed through the damper assembly piston and fluidly coupling the first hydraulic chamber to the thermal compensator chamber.

5. The isolator of claim 4 wherein the thermal compensator further comprises a thermal compensator housing containing the thermal compensator chamber, and wherein the isolator further comprises a piston shaft extending from the damper assembly piston to the thermal compensator housing.

6. The isolator of claim 5 wherein the flow passage comprises a longitudinal channel formed through the piston shaft.

7. The isolator of claim 6 wherein the flow passage further comprises a radially-extending channel formed from the longitudinal channel to an outer surface of the damper assembly piston in fluid communication with the first hydraulic chamber.

8. The isolator of claim 5 wherein the piston shaft extends through the first bellows.

9. The isolator of claim 1 wherein the damper assembly further comprises:
a second hydraulic chamber within the damper assembly housing and configured to be filled with the damping fluid;
a second bellows disposed within the damper assembly housing and bounding an inner circumference of the second hydraulic chamber such that the second bellows is externally pressurized when the first hydraulic chamber is filled with the damping fluid; and
an annulus formed in the damper assembly housing and fluidly coupling the first and second hydraulic chambers.

10. The isolator of claim 9 wherein the damper assembly further comprises a damper assembly piston resiliently suspended within the damper assembly housing between the first and second bellows, the damper assembly piston bounding an inner circumference of the annuls.

11. The isolator of claim 1 wherein the thermal compensator further comprises a thermal compensator housing containing the thermal compensator chamber and separated from the damper assembly housing by an axial gap.

12. The isolator of claim 1 wherein the thermal compensator further comprises:
a thermal compensator bellows disposed within the thermal compensator housing and bounding a portion of the thermal compensator chamber;
a thermal compensator piston joined to the thermal compensator bellows and, when the thermal compensator chamber is filled with the damping fluid, exposed to the damping fluid contained therein; and
a thermal compensator preload spring disposed within the thermal compensator housing and exerting a preload force on the thermal compensator piston.

13. The isolator of claim 12 wherein the thermal compensator piston translates along an axis toward and away from the damper assembly, and wherein the thermal compensator preload spring biases the thermal compensator piston toward the damper assembly.

14. The isolator of claim 12 wherein the thermal compensator further comprises:
a sliding spring seat disposed within the thermal compensator housing for sliding movement therein, the thermal compensator preload spring compressed between the sliding spring seat and an endwall of the thermal compensator housing; and
a connector rod extending from the sliding spring seat, through the thermal compensator bellows, and to the thermal compensator piston.

15. The isolator of claim 12 wherein the thermal compensator preload spring has an outer diameter equal to or greater than the inner diameter of the thermal compensator bellows.

16. The isolator of claim 1 further comprising:
a main spring coupled in parallel with the damper assembly, as taken along a load path through the isolator; and
a secondary spring coupled in series with the damper assembly and in parallel with the main spring, as taken along a load path through the isolator.

17. The isolator of claim 16 wherein secondary spring is mechanically coupled to the damper assembly through the thermal compensator.

18. The isolator of claim 16 wherein the main spring surrounds at least a portion of the thermal compensator.

19. A spacecraft isolation system for minimizing the transmission of vibrations between a spacecraft and a spacecraft payload, the spacecraft isolation system comprising:
a plurality of three parameter isolators, each comprising:
an externally-pressurized damper assembly, comprising:
a damper assembly housing;
a first hydraulic chambers within the damper assembly housing and configured to be filled with a damping fluid; and
a first bellows disposed within the damper assembly housing and bounding the inner circumference of the first hydraulic chamber such that the first bellows is externally pressurized when the first hydraulic chamber is filled with the damping fluid; and
a thermal compensator external to the externally-pressurized damper assembly and fluidly coupled to the first hydraulic chamber; and
mounting hardware coupled to the plurality of three parameter isolators and configured to mount the plurality of three parameter isolators to the spacecraft.

* * * * *